(12) United States Patent
Cosmo

(10) Patent No.: US 6,775,962 B1
(45) Date of Patent: Aug. 17, 2004

(54) VERTICAL BAGGING APPARATUS

(75) Inventor: Guy A. Cosmo, South Setauket, NY (US)

(73) Assignee: K.C. Technical Services, Inc., Bohemia, NY (US)

( * ) Notice: Subject to any disclaimer, the term of this patent is extended or adjusted under 35 U.S.C. 154(b) by 0 days.

(21) Appl. No.: 09/460,836

(22) Filed: Dec. 14, 1999

(51) Int. Cl.[7] .............................. B65B 9/06; B65B 51/30
(52) U.S. Cl. ..................... 53/568; 53/374.9; 53/371.9; 83/171
(58) Field of Search ................. 83/170, 171; 53/552, 53/374.8, 374.9, 389.2, 371.8, 371.9, 374.3, 374.5, 374.6; 493/207, 209

(56) References Cited

U.S. PATENT DOCUMENTS

| | | | | |
|---|---|---|---|---|
| 2,852,898 A | * | 9/1958 | Berg | 53/374.8 |
| 2,966,021 A | * | 12/1960 | Lane et al | 53/552 |
| 3,063,890 A | * | 11/1962 | Saumsigle | 53/374.9 |
| 3,094,823 A | * | 6/1963 | Merritt et al | 53/568 |
| 3,409,494 A | * | 11/1968 | Korzinek | 53/374.8 |
| 3,449,889 A | * | 6/1969 | Molitor, Jr. | 53/568 |
| 3,538,676 A | * | 11/1970 | Runo | 53/552 |
| 3,583,888 A | * | 6/1971 | Shanklin | 53/568 |
| 3,766,710 A | * | 10/1973 | Goodwin et al. | 53/374.9 |
| 4,219,988 A | * | 9/1980 | Shanklin et al. | 53/568 |
| 4,433,527 A | * | 2/1984 | Ramsey et al. | 53/374.9 |
| 5,247,779 A | * | 9/1993 | Wirsig et al. | 53/552 |
| 5,347,795 A | * | 9/1994 | Fukuda | 53/552 |
| 5,475,964 A | * | 12/1995 | Fiesser et al. | 53/374.6 |

FOREIGN PATENT DOCUMENTS

JP 401045206 A * 2/1989 ................. 53/568

* cited by examiner

*Primary Examiner*—John Sipos
(74) *Attorney, Agent, or Firm*—Galgano & Burke, LLP

(57) ABSTRACT

A vertical bagging apparatus includes a vertically mounted spool for dispensing a roll of centerfold plastic film with the fold in the upper position. A pair of vertical metering rollers are mounted adjacent to the spool for advancing the film from the spool. An adjustable generally inverted-V-shaped film inverted is mounted downstream from the metering rollers. A sealing and severing system is located beneath the film invertor and a trim spool is located beneath the sealing and severing system. The film invertor turns the film inside out, relocating the fold from the horizontal axis to the vertical axis. The film invertor also causes the open end of the folded film to be accessible from either above or the side. The film invertor is adjustable by raising and lowering the apex of the inverted-V which relocates the horizontal location of the fold in the film. According to a presently preferred embodiment, the film invertor is made from flexible wire and the free ends of the wire are attached to a takeup shaft. According to the invention, the sealing and severing system includes a flat faced heated bar and a sharp contoured compliant sealing surface. This system provides sealing and severing without buildup of plastic material on the heated bar because the severing is actually performed by the cool sealing surface rather than by the heated bar.

14 Claims, 9 Drawing Sheets

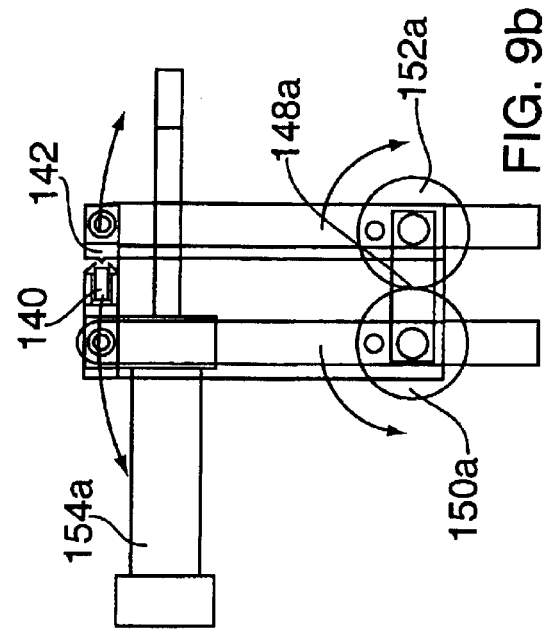
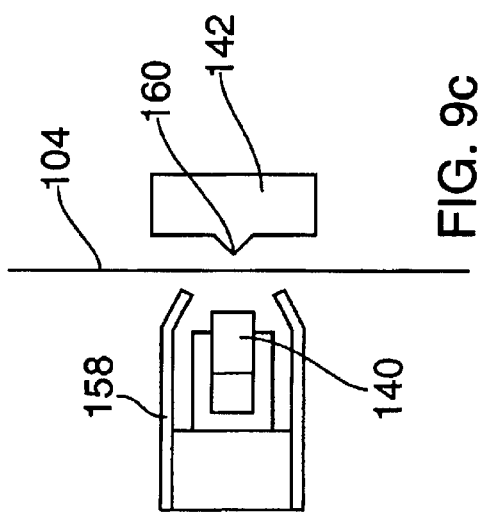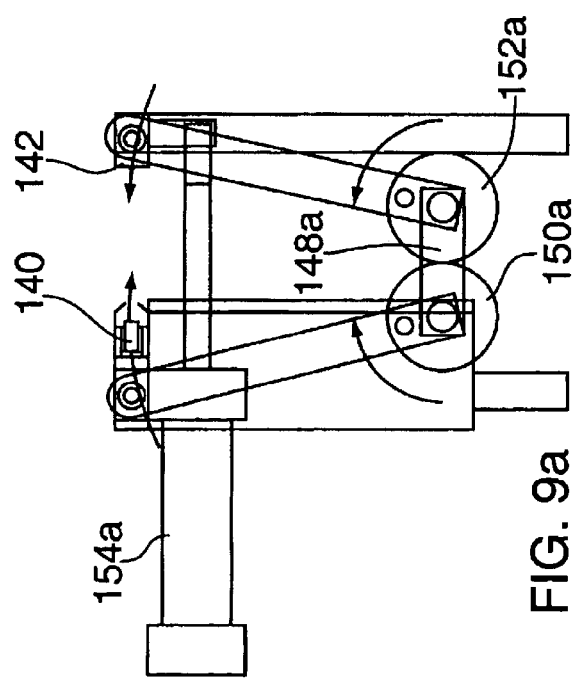

VERTICAL BAGGING APPARATUS

BACKGROUND OF THE INVENTION

1. Field of the Invention

The present invention relates, in general, to the packaging of products in flexible bags or containers and, more particularly, relates to an improved apparatus for bagging a product in a deformable bag and sealing it therein.

2. State of the Art

The distribution of perishable items, such as produce, as well as non-perishable products in thin, usually transparent, plastic bags has become widespread over the years. Plastic deformable bags have considerable strength and, further, have storage capabilities which enhance product quality and extend useful life. Mass production of these bags through automated machines has made them particularly desirable, feasible and cost effective.

Prior art FIG. 1 schematically illustrates a typical bagging apparatus 10. The apparatus 10 includes a roll of plastic 12 which is folded at one end 14. The roll of plastic 12 is located with its axis 16 horizontal and is fed through several feed rollers 18, 20, 22 until it assumes a vertical position. A spreading device 24 is arranged to open the free end 15 of the folded plastic so that a product may be placed between the folded plastic film. Prior art FIG. 2 schematically illustrates a sealing device 28. The sealing device would be located beneath the spreading device 24 in FIG. 1. The sealing device 28 generally includes an L-shaped heated bar 30 and an L-shaped resilient sealing surface 32. The two L-shaped members 30, 32 are slideably mounted on rods 34, 36 so that they may be moved together and apart. As shown in prior art FIGS. 3A and 3B, the heated bar 30 is movable within a clamp 38 and has a rounded end 39. When the L-shaped members are brought together, the clamp 38 holds the plastic sheet 12 against the sealing surface 32 and the heated bar 30 moves forward against the plastic to heat seal it and sever it from the roll of plastic. The sealing and severing locations are illustrated at 31 and 33 in FIG. 1. After sealing, a finished bag 40 is severed from the roll of plastic. A small strip of plastic 42 is left attached to the roll and is taken up by a trim spool 44.

The prior art bagging apparatus has several disadvantages. First, the product must enter the apparatus horizontally between the spreading apparatus and rollers. Second, it is difficult to alter the size of the bags to accommodate different sized products. Third, in order to prevent ragged uneven seals, the heated bar must be coated with a non-stick material. Nevertheless, repeated cycling causes some residual buildup of plastic on the heated bar since it must penetrate the plastic to sever the bag from the roll. The abrasion on the bar by the act of penetrating the plastic causes the non-stick coating to wear off.

SUMMARY OF THE INVENTION

It is therefore an object of the invention to provide a bagging apparatus which allows product loading from either above or the side.

It is also an object of the invention to provide a bagging apparatus which is easily adjustable to make a wide variety of different sized bags It is another object of the invention to provide a bagging apparatus with an improved sealing and severing system.

In accord with these objects which will be discussed in detail below, the vertical bagging apparatus of the present invention includes a vertically mounted spool for dispensing a roll of centerfold plastic film with the fold in the upper position. A pair of vertical metering rollers are mounted adjacent to the spool for advancing the film from the spool. An adjustable generally inverted-V-shaped film inverted is mounted downstream from the metering rollers. A sealing and severing system is located beneath the film invertor and a trim spool is located beneath the sealing and severing system. The film invertor turns-the film inside out, relocating the fold from the horizontal axis to the vertical axis. The film invertor also causes the open end of the folded film to be accessible from either above or the side. The film invertor is adjustable by raising and lowering the apex of the inverted-V which relocates the horizontal location of the fold in the film. According to a presently preferred embodiment, the film invertor is made from flexible wire and the free ends of the wire are attached to a takeup shaft. According to the invention, the sealing and severing system includes a flat faced heated bar and a sharp contoured compliant sealing surface. This system provides sealing and severing without buildup of plastic material on the heated bar because the severing is actually performed by the cool sealing surface rather than by the heated bar. The sealing and severing system is preferably arranged on gear coupled double pivot arms and is actuated by a double piston arrangement. Additional objects and advantages of the invention will become apparent to those skilled in the art upon reference to the detailed description taken in conjunction with the provided figures.

BRIEF DESCRIPTION OF THE DRAWINGS

FIGS. 9a and 9b are side elevational views of the sealing and severing system; and FIG. 9c is an enlarged side elevational view of a portion of the sealing and severing system;

DETAILED DESCRIPTION OF THE PREFERRED EMBODIMENTS

Figure 1:
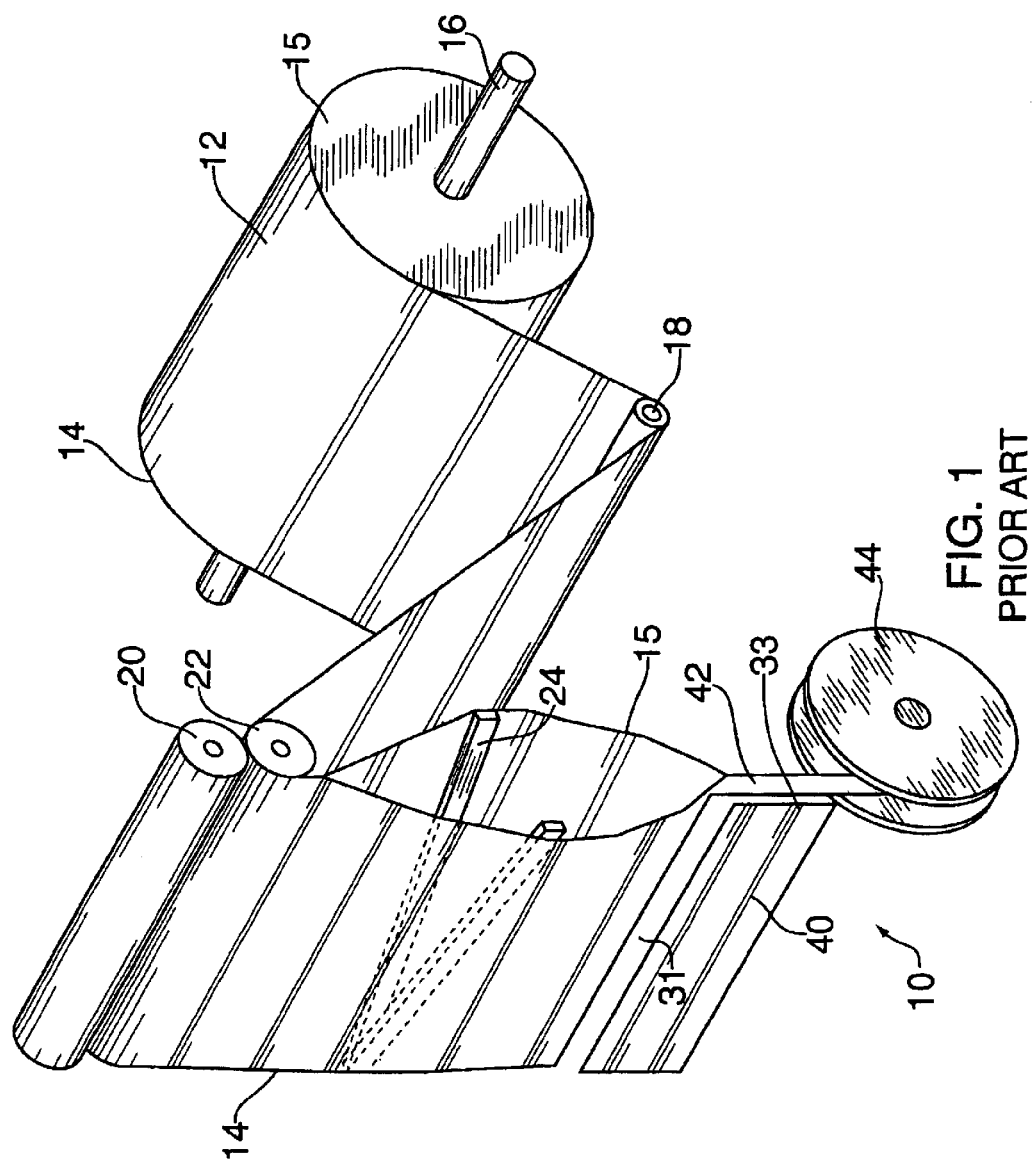
FIG. 1 is a schematic perspective view of a portion of a prior art bagging apparatus.
Figure 2:
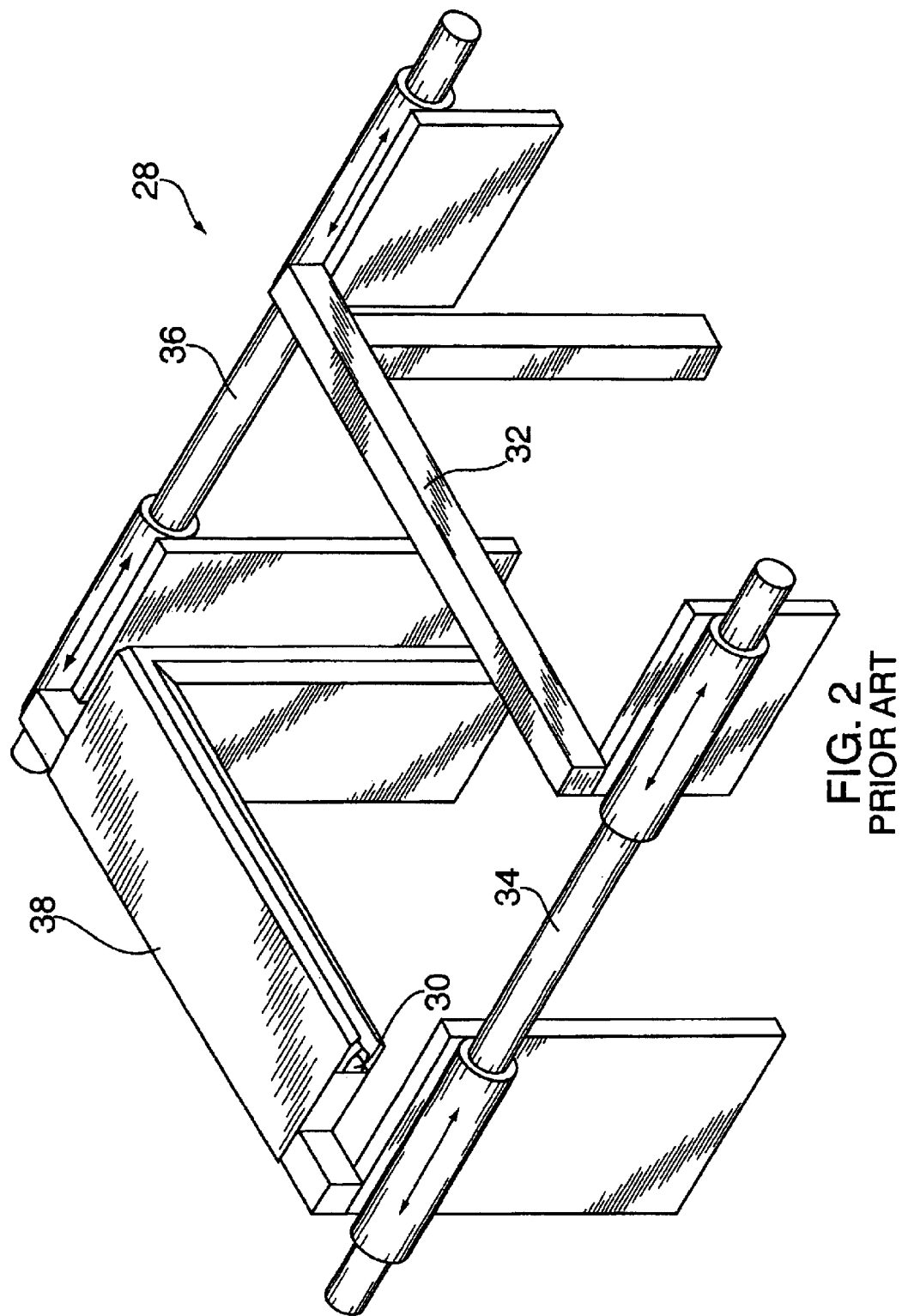
FIG. 2 is a schematic perspective view of the sealing and severing portion of a prior art bagging apparatus.
Figure 3A:
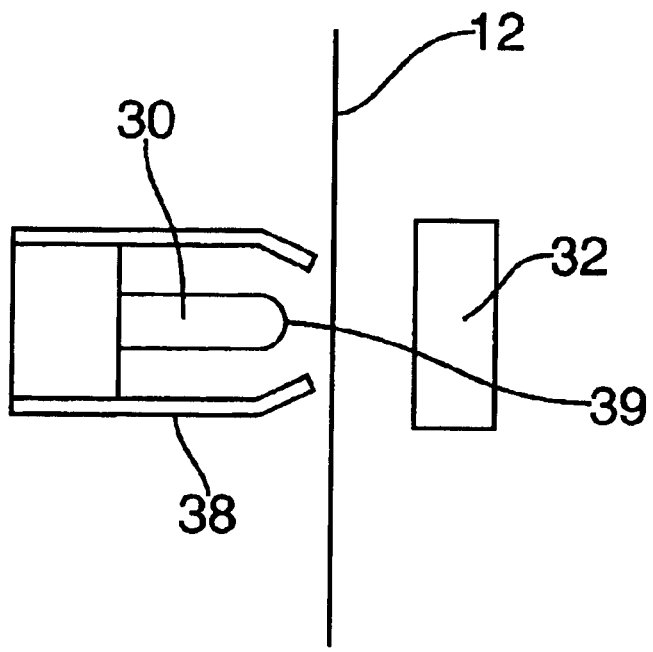
FIGS. 3A and 3B are side elevational views of a portion of the prior art sealing and severing apparatus.
Figure 3B:
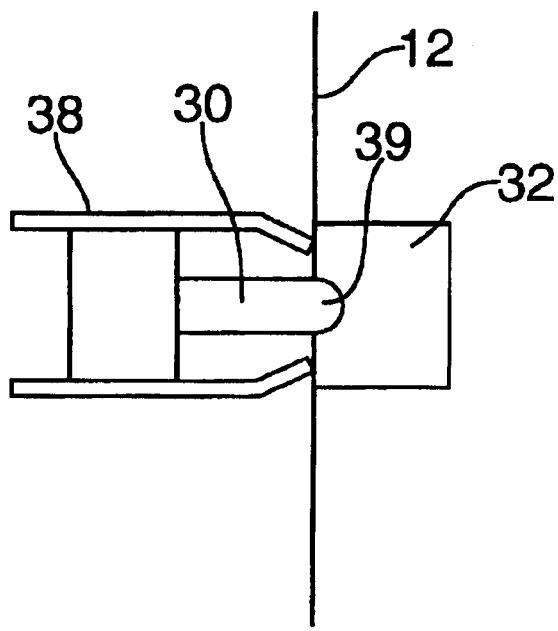
Figure 4:
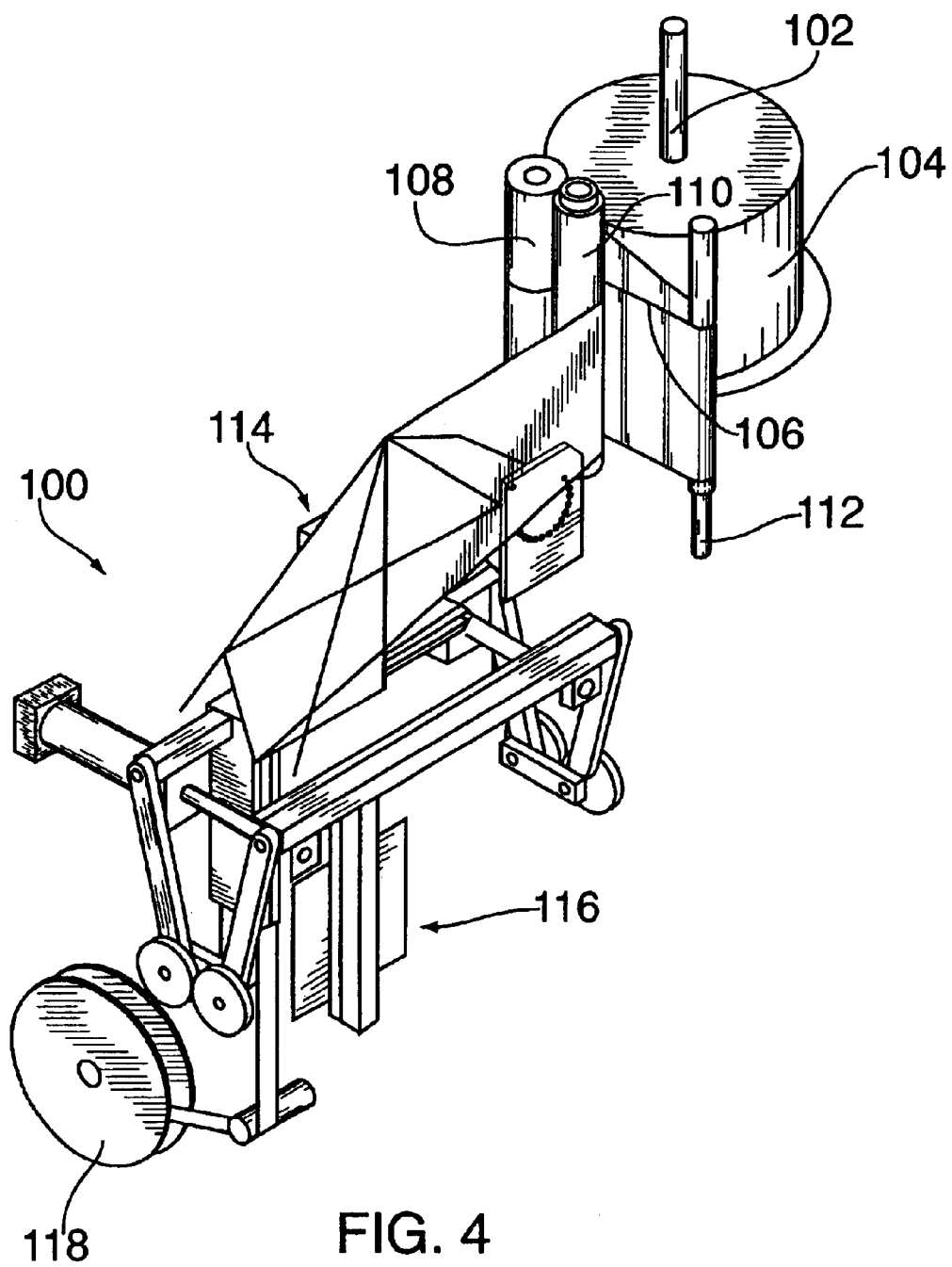
FIG. 4 is a schematic perspective view of a portion of a vertical bagging apparatus according to the invention.
Figure 5:
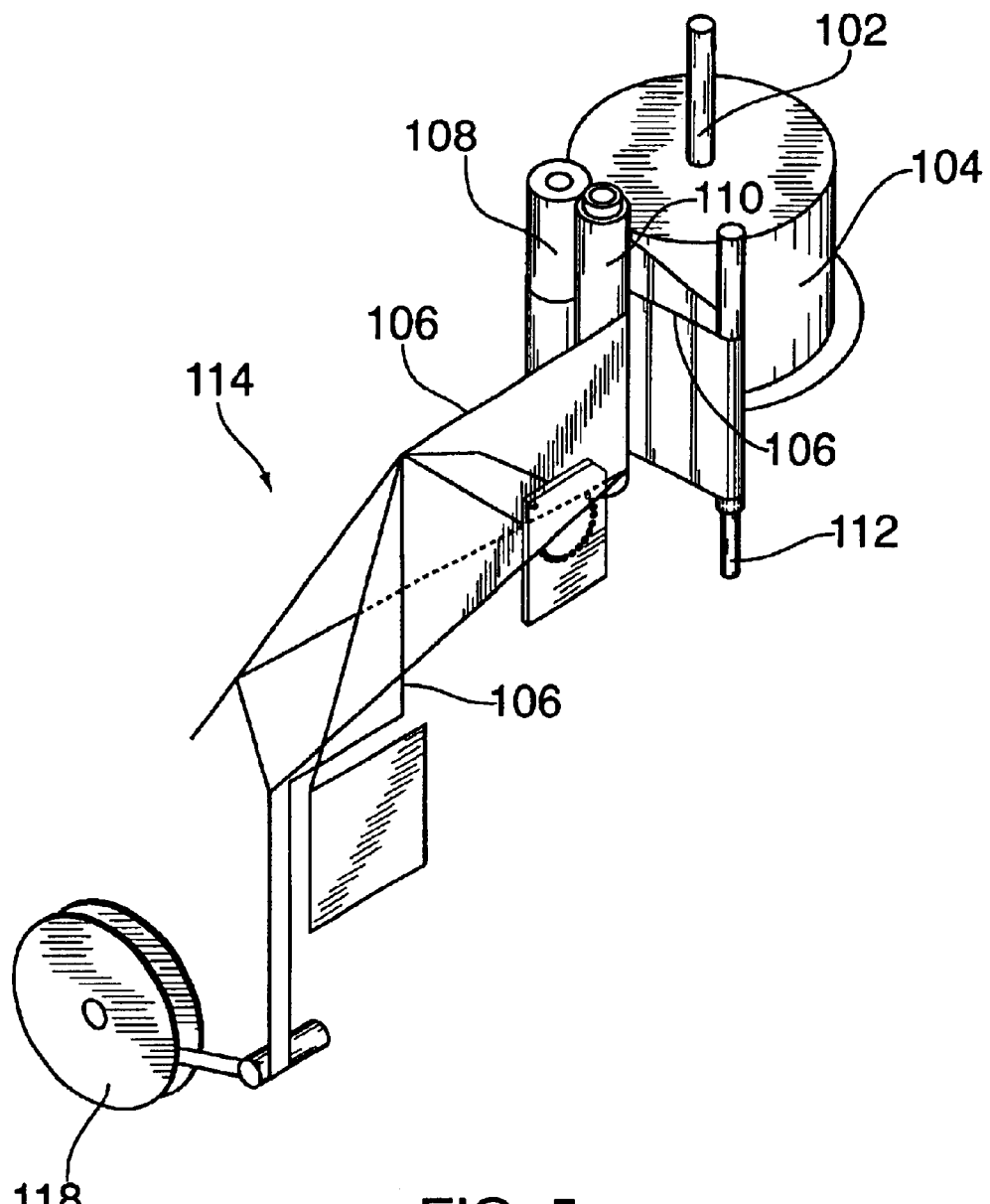
FIG. 5 is a view similar to FIG. 4 but with the sealing and severing system removed.

Referring now to FIGS. 4 and 5, the vertical bagging apparatus 100 includes a vertically mounted spool 102 for dispensing a roll of centerfold plastic film 104 with the fold 106 in the upper position.

A pair of vertical metering rollers 108, 110 are mounted adjacent to the spool 102 for advancing the film 104 from the spool 102. A slack roller arm 112 is also provided between the spool 102 and the metering rollers 108, 110. An adjustable generally inverted-V-shaped film invertor 114 is mounted downstream from the metering rollers 108, 110. A sealing and severing system 116 is located beneath the film invertor 114 and a trim spool 118 is located beneath the sealing and severing system 116.

Figure 6:
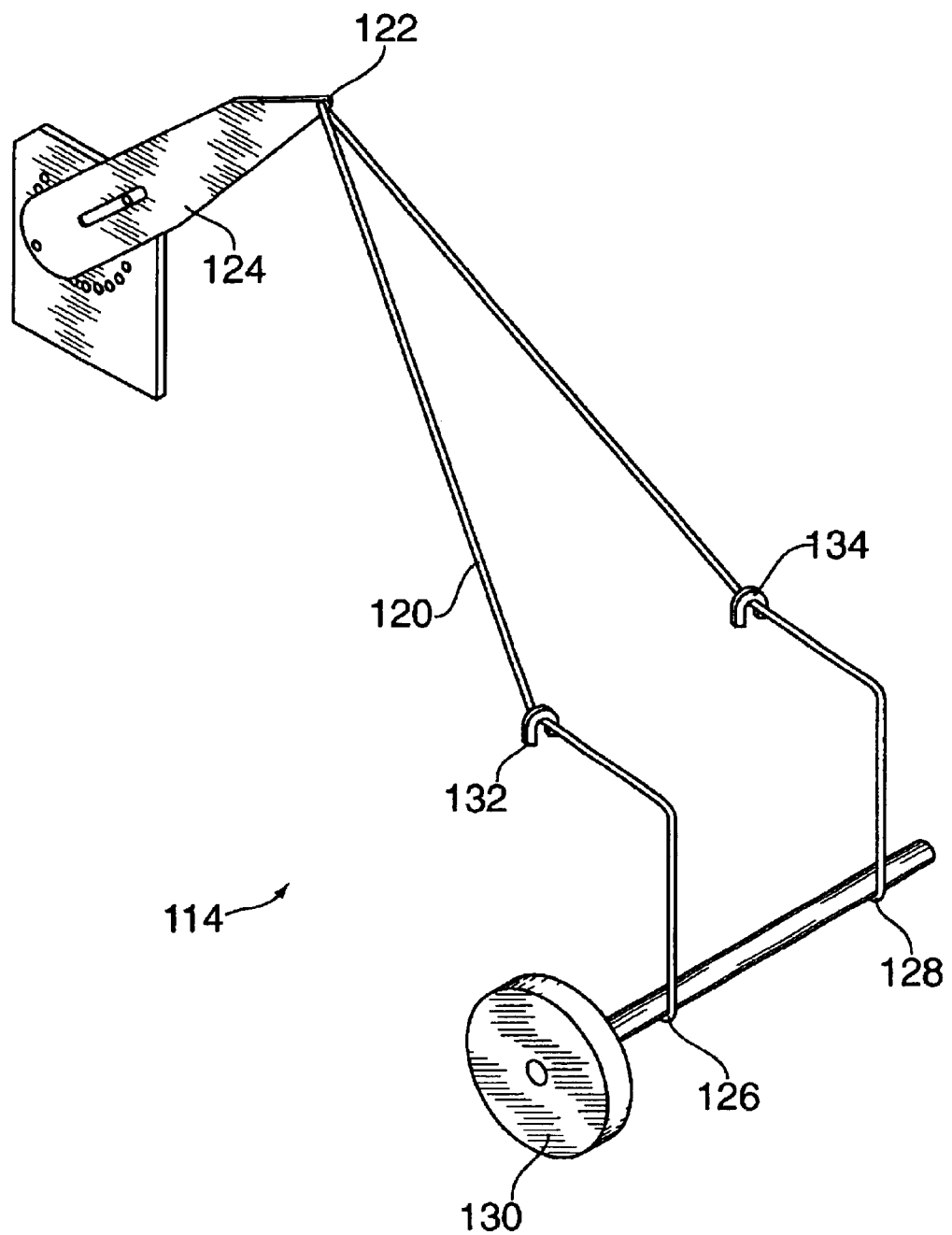
FIG. 6 is an enlarged perspective view of the film invertor.
Figure 7:
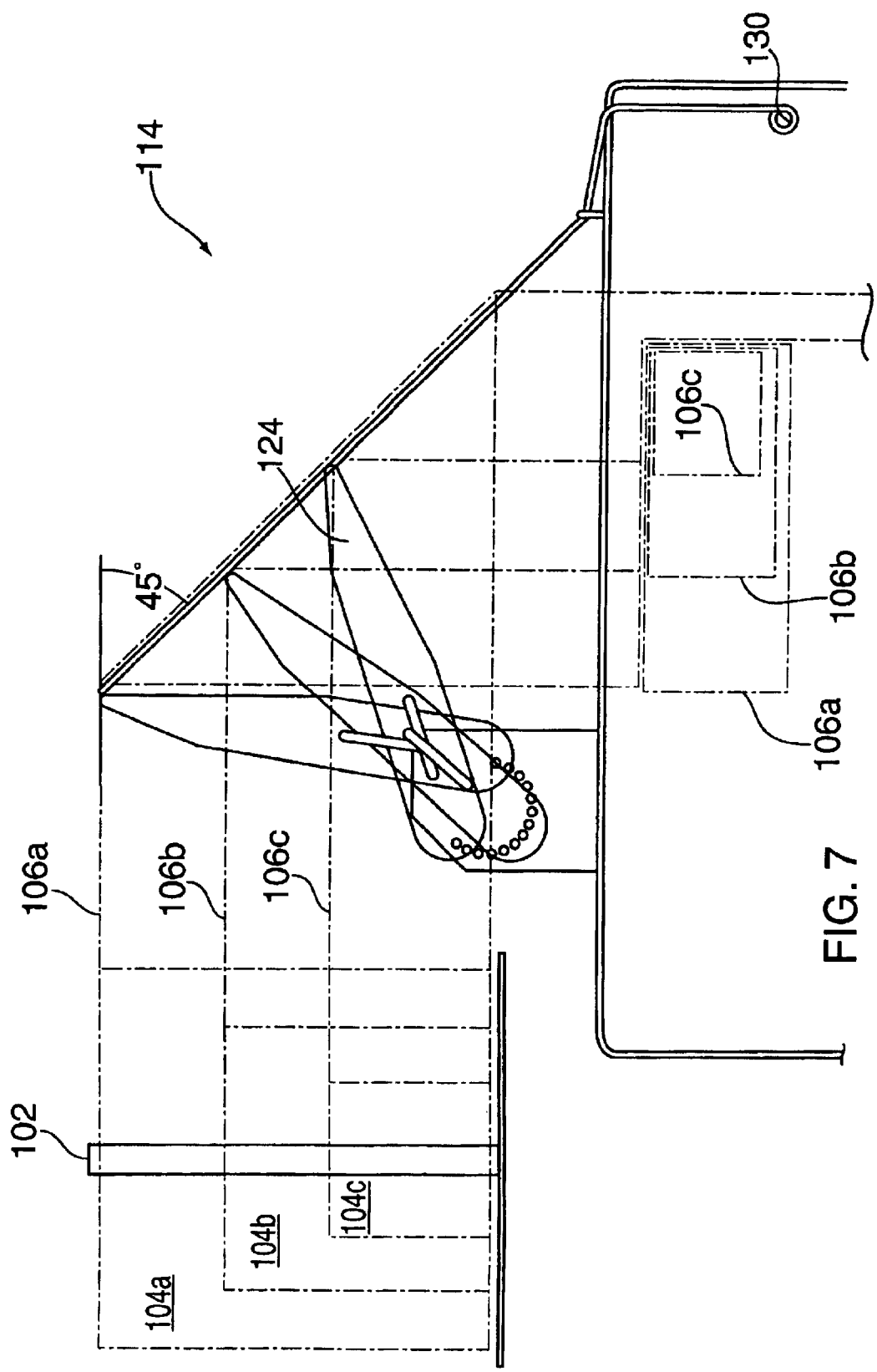
FIG. 7 is a schematic side elevational view of the film invertor in three different positions.

Turning now to FIGS. 5–7, the film invertor 114 is preferably made from a flexible wire 120 which is formed into an -inverted-V-shape by attaching the center 122 of the wire 120 to a lever 124. The free ends 126, 128 of the wire 120 are attached to a takeup shaft 130. The wire is spaced apart by loops 132, 134 so that it worms a generally triangular region between 132, 122, and 134. As seen best in FIGS. 5 and 7, the film invertor 114 turns the film 104 inside out, relocating the fold 106 rom the horizontal axis to the vertical axis. The film invertor also causes the open end of the folded film 104 to be accessible from either above or the side. As shown in FIG. 7, the film invertor 114 is adjustable by raising and lowering the lever 124 which raises and lowers the apex of the inverted-V which relocates the horizontal location of the fold 106 in the film. FIG. 7 illustrates three different sizes of film 104a, 104b, 104c and shows the respective locations of their folds 106a, 106b, 106c.

Figure 8:
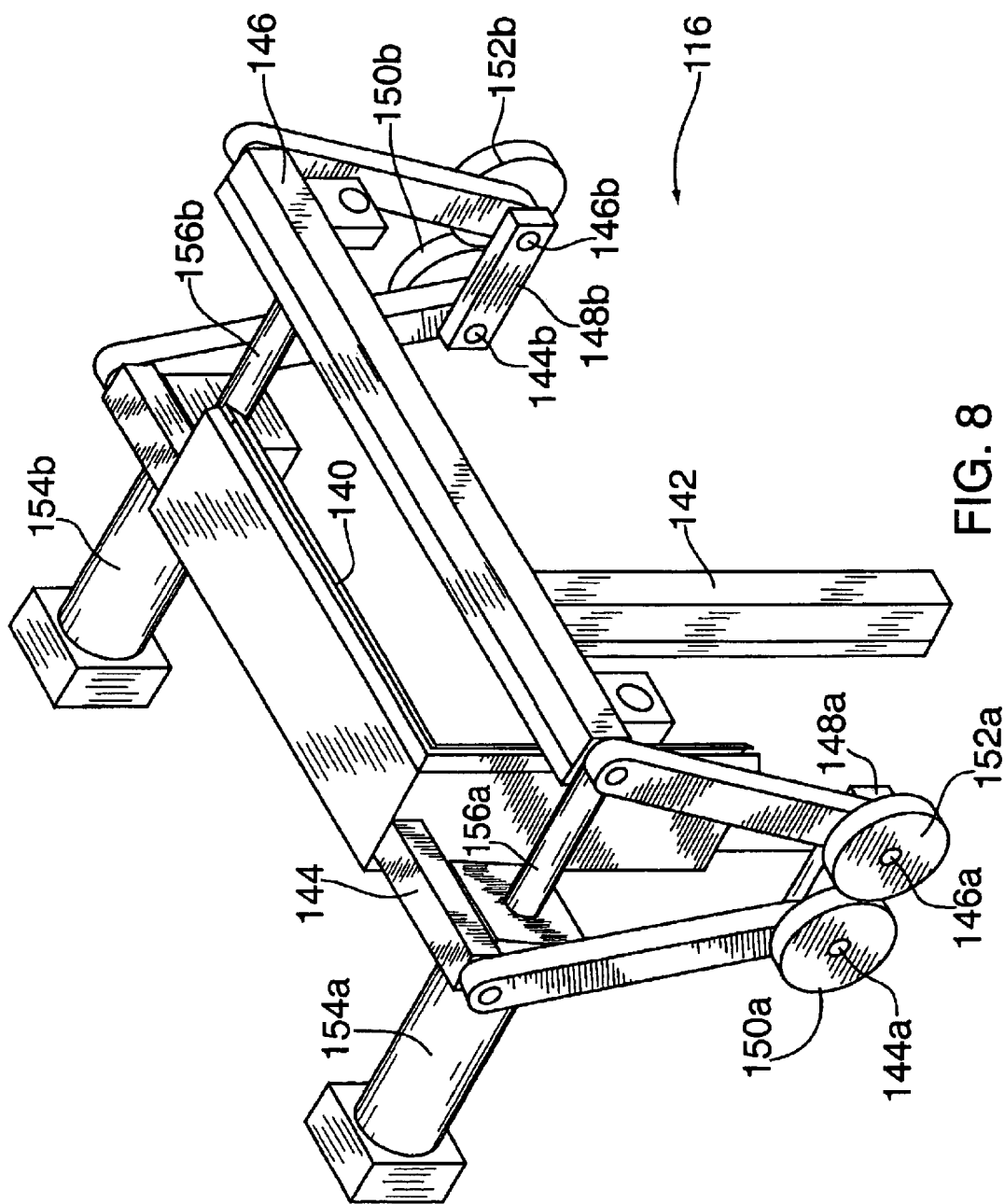
FIG. 8 is an enlarged perspective view of the sealing and severing system.

Referring now to FIG. 8, the sealing and severing system 116 includes an L-shaped heated bar 140 and a corresponding L-shaped sealing surface 142. The heated bar 140 is mounted on a first pivot arm 144 and the sealing surface 142 is mounted on a second pivot arm. Each pivot arm has a pair of spaced apart pivot points 144a, 144b, 146a, 146b. The pivot points 144a and 146a are coupled to each other by a rod 148a and two gears 150a, 152a. The pivot points 144b and 146b are coupled to each other by a rod 148b and two gears 150b, 152b. The pivot arms 144, 146 are actuated by a pair of spaced apart piston actuators 154a, 154b, each having a piston rod 156a, 156b as shown in FIG. 8. The gear and bar couplings allow the L-shaped members to maintain a parallel relationship for sealing and severing as illustrated in FIGS. 9a and 9b. As shown in FIG. 9c, the heated bar 140 is flat faced and surrounded by a clamp 158. The sealing surface 142 is provided with a sharp contour 160. When the sealing and severing system is actuated, the clamp 158 holds the plastic film against the sealing surface 142 and the heated bar 140 moves forward to press the film 104 onto the sharp contour 160 of the sealing surface. This system provides sealing and severing without buildup of plastic material on the heated bar 140 because the severing is actually performed by the contour 160 on the cool sealing surface 142 rather than by the heated bar.

There have been described and illustrated herein a vertical bagging apparatus. While particular embodiments of the invention have been described, it is not intended that the invention be limited thereto, as it intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A vertical bagging apparatus for use with a roll of center folded packaging material, said apparatus comprising:
   a) an upstream feeder spool for holding the roll of center folded packaging material; and
   b) a downstream sealing and severing means for sealing the packaging material and severing it from the roll, wherein
   said sealing and severing means includes a heated bar having a head with a flat sealing surface and an opposed non-heated sealing surface having a generally V-shaped profile, said non-heated sealing surface made of a material which is compliant and yieldable to said heated bar.

2. The apparatus according to claim 1, wherein:
   said sealing and severing means includes two pivot arms and a piston actuator.

3. The apparatus according to claim 2, wherein:
   said two pivot arms are coupled to each other by gears.

4. The apparatus according to claim 1, further comprising:
   c) inversion means for reorienting the packaging material downstream of said feeder spool, said inversion means reorienting the packaging material such that the center fold is substantially vertical.

5. The apparatus according to claim 4, wherein:
   said inversion means is substantially inverted-V-shaped.

6. The apparatus according to claim 4, wherein:
   said inversion means is adjustable to accommodate different sized packaging material.

7. The apparatus according to claim 4, wherein:
   said inversion means is made from substantially flexible wire.

8. A vertical bagging apparatus for use with a roll of center folded packaging material, said apparatus comprising:
   a) an upstream feeder spool for holding the roll of center folded packaging material; and
   b) a downstream sealing and severing means for sealing the packaging material and severing it from the roll, wherein
   said sealing and severing meants includes a heated bar having a head with a flat sealing surface and an opposed non-heated sealing surface having a generally V-shaped profile, said non-heated sealing surface made of a material which is compliant and yieldable to said heated bar.
   said continuous flat head and compliant sealing surface being adapted to press against each other wherein said compliant V-shaped profile deforms to define a continuous mating surface between said sharp profile and said continuous flat head.

9. A vertical bagging apparatus for use with a roll of center folded packaging material, said apparatus comprising:
   a) an upstream feeder spool for holding the roll of center folded packaging material; and
   b) a downstream sealing and severing means for sealing the packaging material and severing it from the roll, wherein
   said sealing and severing means includes a heated bar having a head with a flat sealing surface and an opposed non-heated sealing surface having a generally V-shaped profile, said non-heated sealing surface made of a material which is compliant and yieldable to said heated bar.
   said sealing and severing means includes rigidly mounted actuators coupled to pivotally mounted members which provide for sealing and severing on a parallel plane.

10. The apparatus according to claim 9, further comprising:

c) inversion means for reorienting the packaging material downstream of said feeder spool, said inversion means reorienting the packaging material such that, upon completion of the severing process, the packaged goods are then reoriented into a vertical delivery position.

11. The apparatus according to claim 8, further comprising:

c) inversion means for reorienting the packaging material downstream of said feeder spool, said inversion means reorienting the packaging material such that, upon completion of the severing process, the packaged goods are then reoriented into a vertical delivery position.

12. The apparatus according to claim 1, wherein said generally V-shaped profile has an included angle of ninety degrees.

13. The apparatus according to claim 8, wherein said generally V-shaped profile has an included angle of ninety degrees.

14. The apparatus according to claim 9, wherein said generally V-shaped profile has an included angle of ninety degrees.

* * * * *